(12) United States Patent
Lo et al.

(10) Patent No.: US 11,501,632 B2
(45) Date of Patent: *Nov. 15, 2022

(54) METHODS AND APPARATUS FOR CONTINGENCY COMMUNICATIONS

(71) Applicant: Neo Wireless LLC, Wayne, PA (US)

(72) Inventors: Titus Lo, Bellevue, WA (US);
Xiaodong Li, Bellevue, WA (US)

(73) Assignee: Neo Wireless LLC, Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,047

(22) Filed: May 20, 2021

(65) Prior Publication Data

US 2021/0272444 A1 Sep. 2, 2021

Related U.S. Application Data

(60) Continuation of application No. 17/099,946, filed on Nov. 17, 2020, now Pat. No. 11,049,384, which is a
(Continued)

(51) Int. Cl.
*G08B 23/00* (2006.01)
*G08B 27/00* (2006.01)
(Continued)

(52) U.S. Cl.
CPC ......... *G08B 27/006* (2013.01); *G08B 25/016* (2013.01); *G08B 27/001* (2013.01); *H04W 4/90* (2018.02); *H04W 76/50* (2018.02)

(58) Field of Classification Search
CPC .. G08B 27/006; G08B 25/016; G08B 27/001; H04W 4/90; H04W 76/50
(Continued)

(56) References Cited

U.S. PATENT DOCUMENTS 4,476,469 A 10/1984 Lander
5,914,675 A 6/1999 Tognazzini
(Continued)

FOREIGN PATENT DOCUMENTS

EP 2129007 A1 * 12/2009 ........ H04W 72/0406
GB 2382265 5/2003

OTHER PUBLICATIONS

3GPP TS 36.300 V11.0.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Release 11; 3GPP Organizational Partners; Copyrgt. 2011; 194 pages.
(Continued)

*Primary Examiner* — Tai T Nguyen
(74) *Attorney, Agent, or Firm* — Volpe Koenig

(57) ABSTRACT

Methods and systems for contingency communication are disclosed. In one embodiment, a method for providing emergency services may be performed by a base station operating in a communication system in an embodiment, the method for providing emergency services includes transmitting a beacon signal to indicate an emergency status to enable portable devices to operate in a stress mode. A distress signal may be transmitted by a mobile device in response to the beacon signal to the base station, wherein the distress signal carries information at least comprising user identity associated with the mobile device, geolocation of the mobile device, or biometrics of a user of the mobile device.

81 Claims, 11 Drawing Sheets

Related U.S. Application Data continuation of application No. 16/400,283, filed on May 1, 2019, now abandoned, which is a continuation of application No. 15/713,002, filed on Sep. 22, 2017, now Pat. No. 10,325,483, which is a continuation of application No. 15/016,092, filed on Feb. 4, 2016, now Pat. No. 9,773,406, which is a division of application No. 13/424,043, filed on Mar. 19, 2012, now Pat. No. 9,275,540.

(60) Provisional application No. 61/595,578, filed on Feb. 6, 2012.

(51) Int. Cl.
*H04W 4/90* (2018.01)
*H04W 76/50* (2018.01)
*G08B 25/01* (2006.01)

(58) Field of Classification Search
USPC .......................................................... 340/502
See application file for complete search history.

(56) References Cited

U.S. PATENT DOCUMENTS

| | | | |
|---|---|---|---|
| 6,314,281 | B1 | 11/2001 | Chao et al. |
| 6,788,199 | B2 | 9/2004 | Crabtree et al. |
| 7,346,336 | B2 | 3/2008 | Kampel et al. |
| 8,041,330 | B1 | 10/2011 | Garin |
| 9,351,106 | B2 | 5/2016 | Markham et al. |
| 2003/0034881 | A1 | 2/2003 | Linnett et al. |
| 2004/0042434 | A1 | 3/2004 | Kennedy et al. |
| 2004/0075738 | A1 | 4/2004 | Burke et al. |
| 2004/0203843 | A1 | 10/2004 | Najafi |
| 2006/0009191 | A1 | 1/2006 | Malone, III |
| 2006/0023105 | A1 | 2/2006 | Kostrzewski et al. |
| 2006/0178128 | A1 | 8/2006 | Eaton et al. |
| 2007/0026889 | A1 | 2/2007 | Yamauchi et al. |
| 2007/0230338 | A1 | 10/2007 | Shao et al. |
| 2008/0079835 | A1 | 4/2008 | Lin |
| 2008/0194227 | A1 | 8/2008 | Nalley et al. |
| 2009/0268654 | A1 | 10/2009 | Baglin et al. |
| 2009/0284348 | A1 | 11/2009 | Pfeffer |
| 2010/0239042 | A1 | 9/2010 | Hamalainen et al. |
| 2010/0265874 | A1 | 10/2010 | Palanki et al. |
| 2011/0124359 | A1 | 5/2011 | Shimomura |
| 2011/0159837 | A1 | 6/2011 | Daly et al. |
| 2011/0212699 | A1 | 9/2011 | Howard et al. |
| 2011/0235555 | A1 | 9/2011 | Zhang et al. |
| 2012/0218103 | A1 | 8/2012 | Alves et al. |
| 2012/0302197 | A1 | 11/2012 | Koontz et al. |
| 2013/0046968 | A1* | 2/2013 | Dinan ............... H04W 72/0413 713/150 |
| 2013/0176982 | A1 | 7/2013 | Han et al. |
| 2013/0272271 | A1 | 10/2013 | Han et al. |

OTHER PUBLICATIONS

Dahlman et al., *4G: LTE/LTE-Advanced for Mobile Broadband*, Academic Press; 1st edition (Mar. 21, 2011).
European Patent Application No. 13746875.7; Extended Search Report; dated Sep. 23, 2015; 6 pages.
European Patent Application No. 16190624.3; Extended Search Report; dated Feb. 23, 2017; 7 pages.
IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 6: Wireless Access in Vehicular Environments, IEEE Std. 802.11p-2010 (Jul. 15, 2020).
International Patent Application No. PCT/US2013/024944: International Search Report and Written Opinion dated Apr. 15, 2013, 18 pages.
Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.4.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).
Wassal, Amr G., et al., "Efficient Implementation of Secondary Synchronization Symbol Detection in 3GPP LTE", Circuits and Systems (ISCAS), 2011 IEEE International Symposium ON, IEEE, May 15, 2011, pp. 1680-1683, XP031997965, DOI: 10.1109/ISCAS.2011.5937904 ISBN: 978-1-4244-9473-6.
Ericsson, "E-UTRA Cell Search," TSG-RAN WG1, R1-060105, Helsinki, Finland (Jan. 23-25, 2006).
Interdigital, "Considerations on Cell Search for Evolved UTRA," 3GPP TSG RAN WG1 Meeting #44bis, R1-060850, Athens, Greece (Mar. 27-31, 2006).
Sesia et al., "LTE The UMTS Long Term Evolution: From Theory to Practice," Second Edition, Chapter 9: Downlink Physical Data and Control Channels, pp. 189-244 (2011).

\* cited by examiner

METHODS AND APPARATUS FOR CONTINGENCY COMMUNICATIONS

CROSS REFERENCE TO RELATED APPLICATIONS

This application is a continuation of U.S. patent application Ser. No. 17/099,946, filed Nov. 17, 2020 which issued as U.S. Pat. No. 11,049,384 on Jun. 29, 2021, which is a continuation of U.S. patent application Ser. No. 16/400,283, filed May 1, 2019 now abandoned, which is a continuation of U.S. patent application Ser. No. 15/713,002, filed Sep. 22, 2017, which issued as U.S. Pat. No. 10,325,483 on Jun. 18, 2019, which is a continuation of U.S. patent application Ser. No. 15/016,092, filed Feb. 4, 2016, which issued as U.S. Pat. No. 9,773,406 on Sep. 26, 2017, which is a divisional of U.S. patent application Ser. No. 13/424,043, filed Mar. 19, 2012, which issued as U.S. Pat. No. 9,275,540 on Mar. 1, 2016, which claims benefit of Provisional U.S. Patent Application No. 61/595,578, filed Feb. 6, 2012, the contents of which are incorporated herein by reference in its entirety.

TECHNICAL FIELD

The disclosed embodiments relate to contingency communications such as, for example, emergency networks and systems for search and rescue.

BACKGROUND

In a natural or man-made disaster (e.g., earthquake), victims can be buried or stranded under or beneath collapsed buildings. In many cases, emergency workers encounter difficulties locating victims and rescuing them in a timely manner. What is needed is a system that enables emergency workers to quickly locate victims during search-and-rescue efforts during such disaster scenarios.

SUMMARY

In accordance with various embodiments of the present invention, methods and systems for providing contingency communications are disclosed. In one embodiment, a method for providing contingency communications may be performed by a portable device operating in a wide area communication system such as a cellular voice or data network. In an embodiment, the method for providing contingency communications includes operating in at least one of a plurality of modes. A stress mode may be entered from a normal mode in response to receiving a beacon signal indicating an emergency status. An indication may be provided on the portable device regarding the emergency status via an audio, visual, or mechanical user interface during the stress mode. An acknowledgement signal may be transmitted in response to the beacon signal.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The present invention will be thoroughly understood from the detailed description given below and from the accompanying drawings of various embodiments of the invention, which, however, should not be taken to limit the invention to the specific embodiments, but are for explanation and understanding only.

DETAILED DESCRIPTION OF ILLUSTRATIVE EMBODIMENTS

Figure 1:
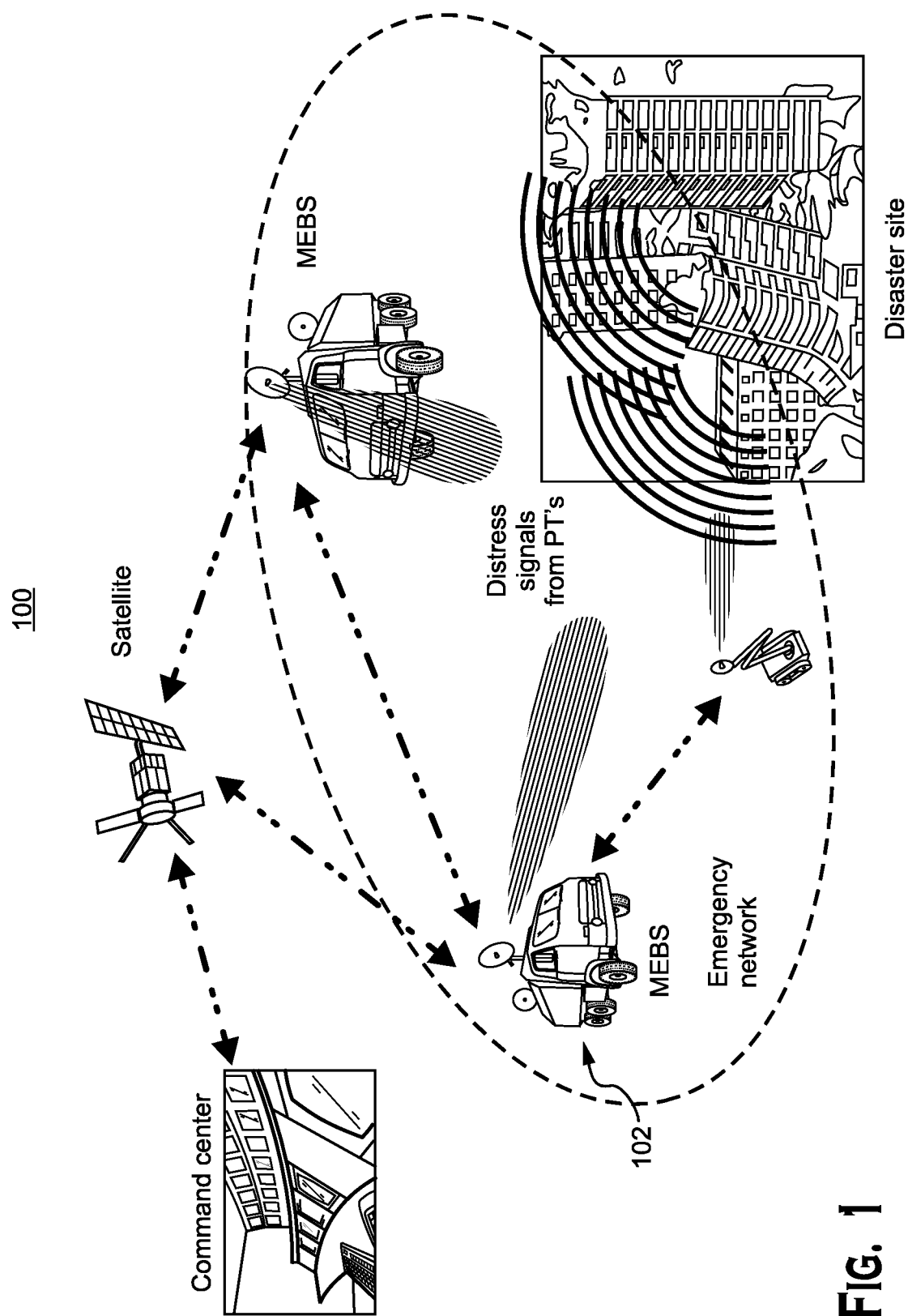
FIG. 1 is a graphical depiction of an emergency network used for search and rescue in a disaster.

Methods and apparatus for contingency communications such as, for example, emergency networks and systems for search and rescue, are disclosed.

In some embodiments of the invention, an emergency network may comprise mobile emergency base stations (MEBS's), portable search units (PSU's), and personal terminals (PT's). A MEB may comprise multiple communication systems. Furthermore, an MEB may be equipped with a synchronization subsystem or a location determination subsystem such as a Global Positioning System (GPS) receiver. MEBS's may communicate with each other over a predetermined wireless network and exchange information. Some of the information may be obtained from processing distress signals. A PSU may be a device carried by a mobile rescuer or mounted on a rescuing robot. A PSU may comprise multiple communication systems and may be equipped with a synchronization subsystem or a location determination subsystem. A PT may be a stand-alone device or integrated or embedded into a portable host device. A PT may comprise or be communicatively coupled with various sensors that are configured or designed to sense the surrounding environment.

In some embodiments, beacon signals and probing signals may be transmitted by a MEBS over a DL broadcast channel. The signals may be relayed or repeated by a PSU or a PT. A beacon signal may contain information that the PT can use to perform receiving functions. The beacon signal may also contain messages and instructions addressed to the PT's. A probing signal may contain a unique identification for the PT or a group of PT's. The probing signal may also contain information to allow the PT to perform receiving functions, or messages and instructions for the PT. Distress signals may be transmitted by PT's on UL channels to a MEBS or a PSU. Distress signals may be relayed or repeated by a PT. A distress signal may contain essential data about its bearer. A beacon signal, probing signal, or a distress signal may occupy a frequency band designated for search and rescue during emergency state, or may occupy or overlay on a frequency band used by a normal radio network.

Beacon signals may be periodically broadcast by MEBS's via the DL channel, and the PT's may respond to the beacon signal by transmitting their distress signals via the UL channels in a manner as instructed by the beacon signals. When MEBS's successfully detect the distress signals over the UL channels, the MEBS's may proceed to decode the information carried by the disaster signals, extract the attributes associated with the disaster signals, and report the data and information associated with the PT's to the master MEBS. The master MEBS may combine the data and information to determine the PT's complete identifications, locations, biometrics, and priority levels for rescue operations.

The following discussion contemplates the application of the disclosed technology to communication systems, communication networks, wireless local area networks, wireless ad hoc networks, time division duplex (TDD) networks, frequency division duplex (FDD) networks, wireless mobile terminals, and wireless base stations.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium or other memory readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system However, the program(s) can be implemented in assembly or machine language, if desired. In any case, the language may be a compiled or interpreted language, and combined with hardware implementations.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below", and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Emergency Networks Components

FIG. 1 illustrates a scenario where an emergency network is deployed for search and rescue. The components of an emergency network 100 may include mobile emergency base stations (MEBS's) 102, portable search units (PSU's), and personal terminals (PT's).

MEBS

A MEBS 102 may be mounted on a land vehicle, airborne craft, or marine vessel. A MEBS may also be set up at a fixed location such as a hill-top or a tower site of an existing/traditional/normal radio network. Without loss of generality, MEBS is used in the ensuing paragraphs to illustrate functions of either a fixed or mobile base station.

The vehicle that a MEBS is mounted on may also serve as a local command post. The mounted MEBS may communicate with a command center or any facility outside of the emergency network via a communication system or network such as a communication satellite, a point-to-point microwave system, or/and a cellular wireless network.

A MEBS may consist of multiple communication systems. Furthermore, it may be equipped with a synchronization or location determination subsystem, such as a Global Positioning System (GPS) receiver. MEBS's may communicate with each other over a specific wireless network and exchange information obtained from processing distress signals. A MEBS may communicate with a PSU via a specific wireless network, exchanging information with and providing instruction to the PSU. A MEBS may transmit the beacon or probing signals to PT's and receive distress signals from PT's.

PSU

A PSU can be carried by a mobile rescuer or mounted on a rescuing robot. A PSU may consist of multiple communication systems and may be equipped with a synchronization or location determination subsystem, such as a GPS receiver. A PSU may communicate with a MEBS via a specific wireless network. A PSU may also transmit beacon or probing signals to PT's and receive distress signals from PT's. In some embodiments, a PSU may be considered a portable MEBS and may implement similar functions.

PT

Figure 2:
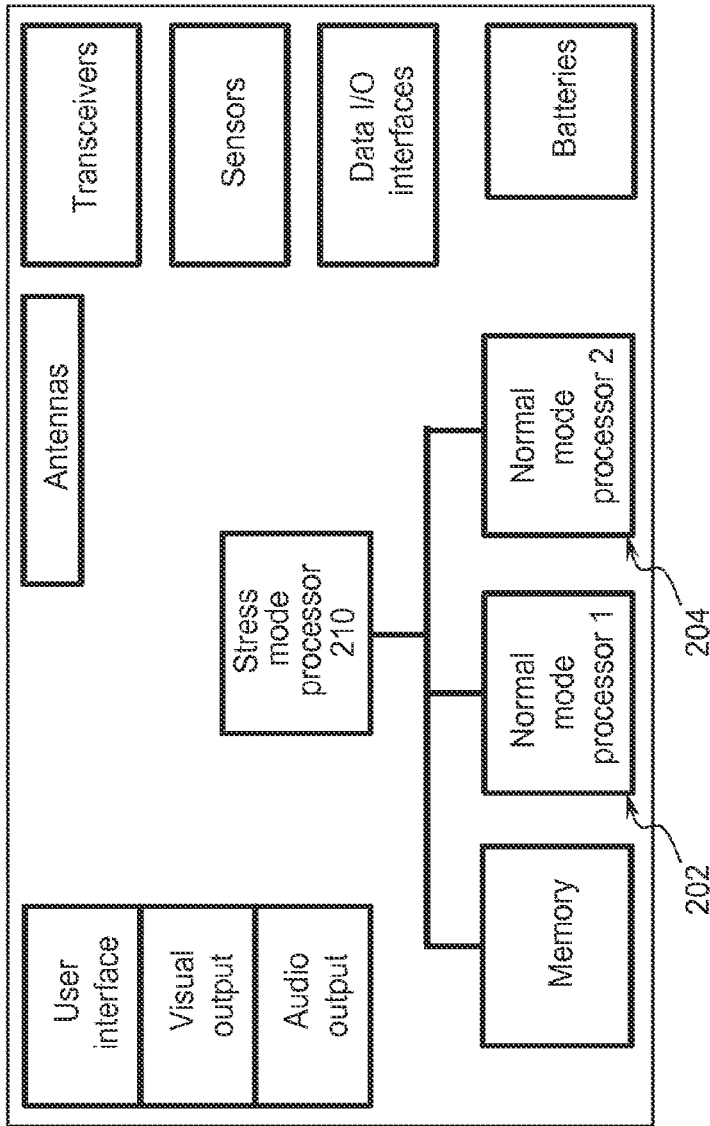
FIG. 2 is a graphical representation of a typical portable device comprising major components.

A PT can be a stand-alone device, or integrated or embedded into a portable host device such as a cellular phone, personal data assistant (PDA), tablet computer, iPhone, iPad, smart phone, portable media player, portable game player, and watch. A PT can also be a part of integrated circuitry in a host device or be a set of software code that runs on a host device (or portable device). The host device may be carried by or in the vicinity of a person. A typical portable device 200, shown in FIG. 2, may comprise processors for normal-mode operations 202 204 and a processor for stress-mode operation 210, as well as other major components. The stress-mode processor 210 may be coupled directly or via a data bus with the normal-mode processors 202204 and other major components. The operation of the stress-mode processor 210 may be independent of the operations of the normal processors 202204. The stress-mode processor 210, when entering into the stress mode, may take control of the operations of the major components. For example, it may activate some components while shutting down others.

A PT may consist of or be coupled with various sensors including, but not limited to, motion sensing, orientation sensing, audio sensing, optical sensing, pressure sensing, temperature sensing, chemical sensing, biological/physiological sensing, and/or biometric sensing. The sensors may be configured or designed to sense the surrounding environment. For example, a PT may also be equipped with multiple audio or video sensors that can sample audio or video from different angles or directions. These sensors may be configured or controlled by the emergency network or a normal radio network to obtain better results. The operation can help rescue team to better observe and understand the disaster environment, for example, inside a collapsed building.

In some embodiments, a sensor or sensors on a PT may be designed to provide a wide angle view of the surrounding environment. For example, an optical sensor may be in the form of a fish eye having a 360-degree view. A part of the PT containing a sensor or sensors may pop up from the host device to survey the environment. A sensor may have a shape of polyhedron, such as a cube or octahedron, with sensing capability on each side or multiple sides to provide a full or near full view of the environment.

A PT may be configured to receive the beacon or probing signals from one or more MEBS's and PSU's and transmit distress signals to one or more MEBS's and PSU's.

A PT may comprise both receiving circuitry and transmitting circuitry. The receiving circuitry may be further divided into two parts. The first part may perform the function of detecting beacon or probing signals and the second part may perform other receiving functions such as demodulation and decoding.

In some embodiments, the detection circuitry may be kept powered on continuously, turned on for a period and off for another period of different lengths, or turned on and off under predetermined conditions. In an embodiment, the detection circuitry may be turned on 1. when its host device has not received the normal and/or expected wireless signals (e.g., GSM, HSPA, and LTE) for a specified period of time;

2. when its host device senses that there has been no movement for a predetermined period of time, that it is under some form of physical pressure, or/and that its carrier is under certain biological/physiological stresses; or 3. when instructed by a host device that receives instruction of a normal radio network. For example, a normal radio network may inform the host device and therefore a PT how often it should check/detect a beacon signal potentially transmitted from a MEBS The period may be configurable by the normal radio network or emergency network.

When its host device is turned off, the PT detection circuitry may be kept functioning using one of the methods described above.

Once a PT receives a beacon or probing signal from a MEBS or PSU that indicates an emergency state, the PT may enter into a stress mode.

When the detection circuitry detects beacon/probing signals, the rest of the receiving circuitry may be turned on to perform the necessary receiving functions.

The transmitting circuitry may be turned on when the PT is ready or scheduled to transmit distress signals to the MEBS's or PSU's. After transmission, the transmitting circuitry may be turned off until it is ready or scheduled to transmit again.

The PT may also perform the following functions:

1. The PT alerts its carrier of the ongoing rescuing effort through audio or/and visual messages.

2. The PT sends out audio or/and visual messages to comfort and encourage its earner.

3. The PT turns off the normal functions of the cell phone, PDA, or players to save power.

In some embodiments, the host device can be powered by at least two batteries, one reserved for performing normal functions such as phone calls and the other for the PT operations. Alternatively, the host device may reserve a minimum level of power for performing the PT functions and any power exceeding that level can be used for carrying out general applications. Some functions of the PT can be overridden manually.

Emergency Network

An emergency network may be formed between the MEBS's, PSU's and PT's. A MEBS within the emergency network may serve as the master MEBS, which provides a reference that all other MEBS's, all PSU's and PT's can synchronize to. An emergency network, including MEBS's, PSU's, and PTs, may operate at a low frequency band for deep in-building penetration. A MEBS may cover a large area with a high level of transmission power.

The emergency network may consist of multiple systems that enable communications between MEBS's, PSU's, and PT's.

Figure 3:
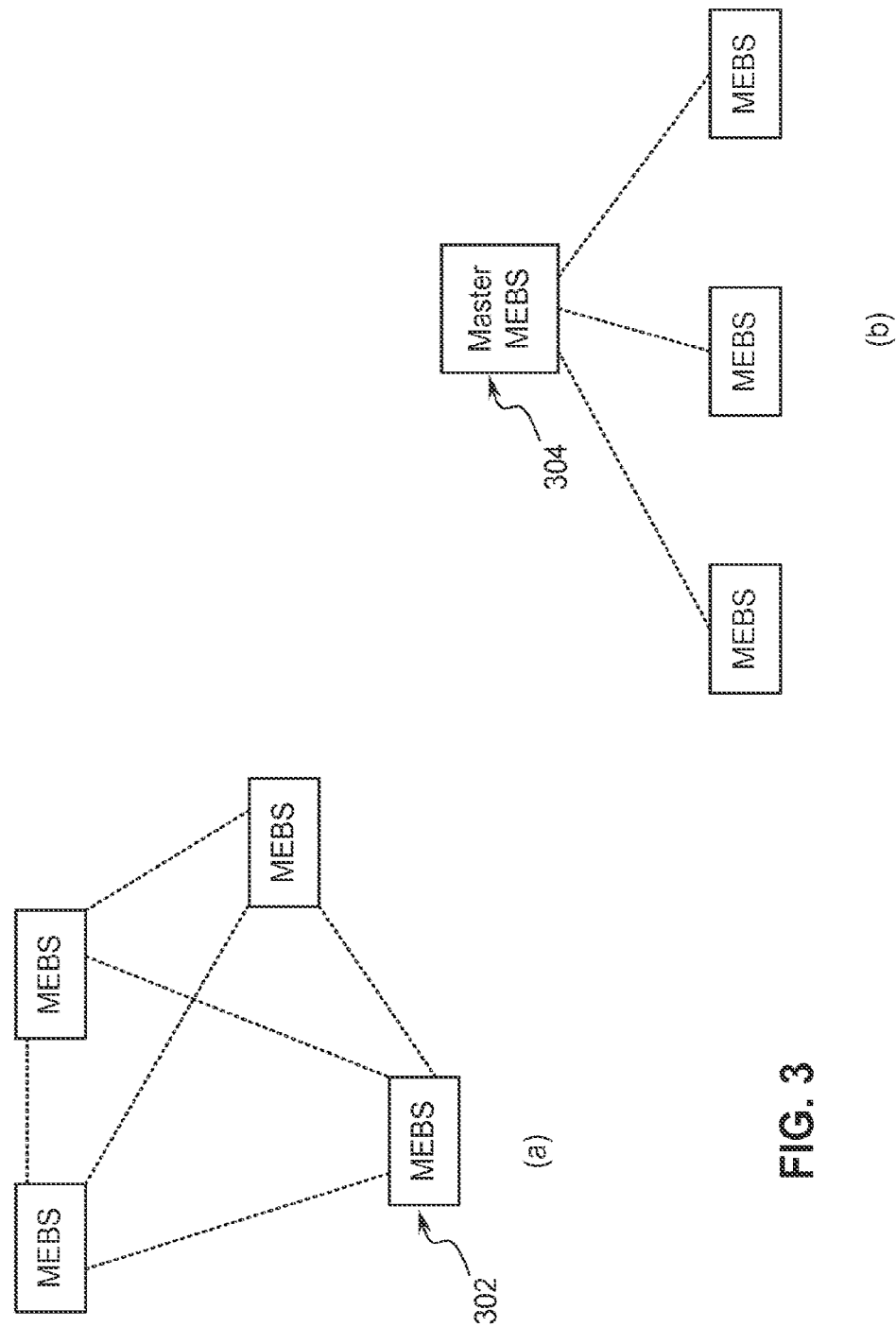
FIG. 3 is a graphical depiction of (a) a mesh network of MEBS's and (b) a star connection of the MEBS's to the master MEBS.

The MEBS's 302 may form a mesh network and exchange information with each other, as depicted in FIG. 3a. Alternatively, a MEBS only communicates with the master MEBS 304, as depicted in FIG. 3b.

Figure 4:
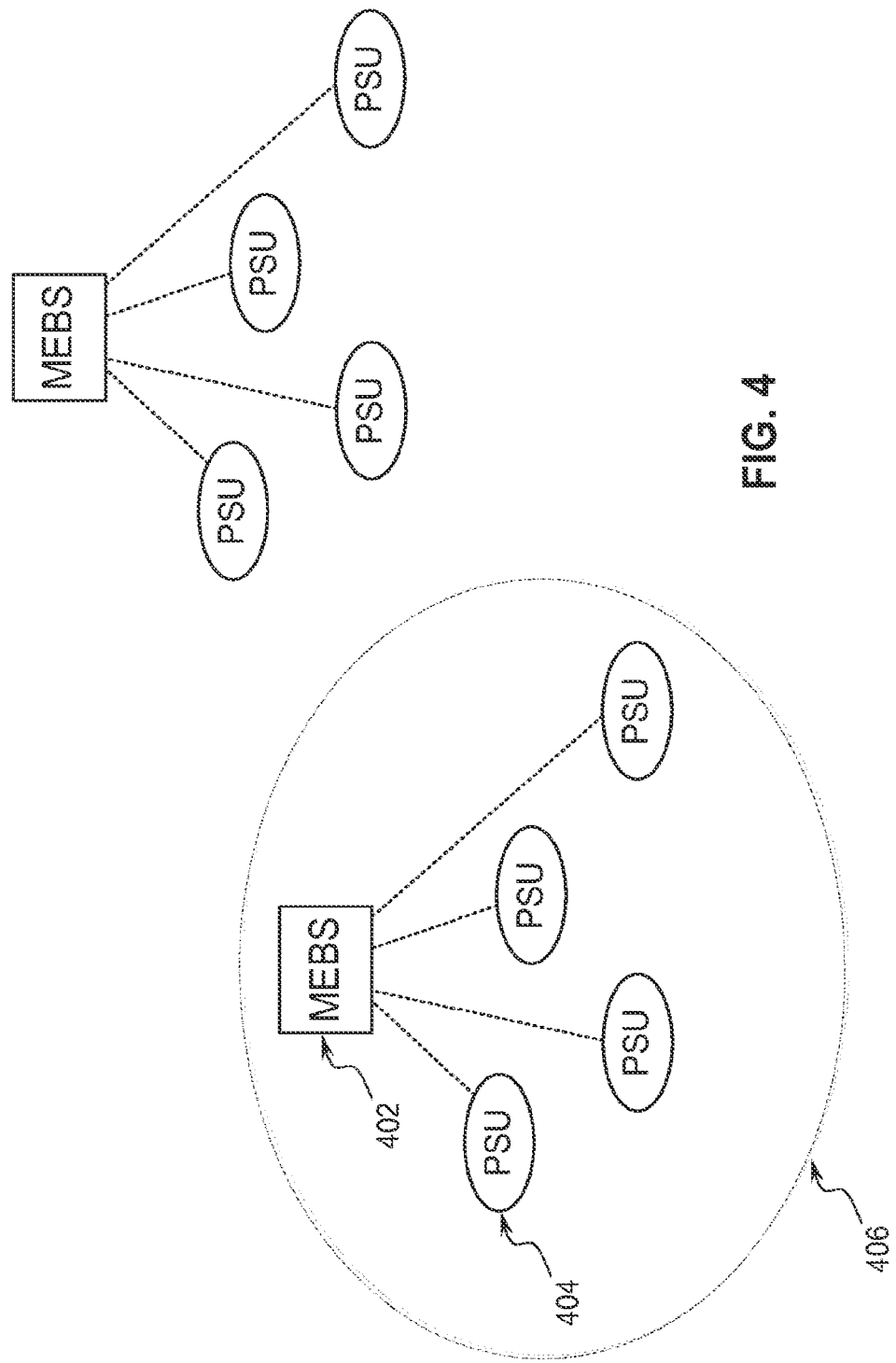
FIG. 4 is a graphical depiction of a group of PSU's connected to a MEBS to form a cluster.
Figure 5:
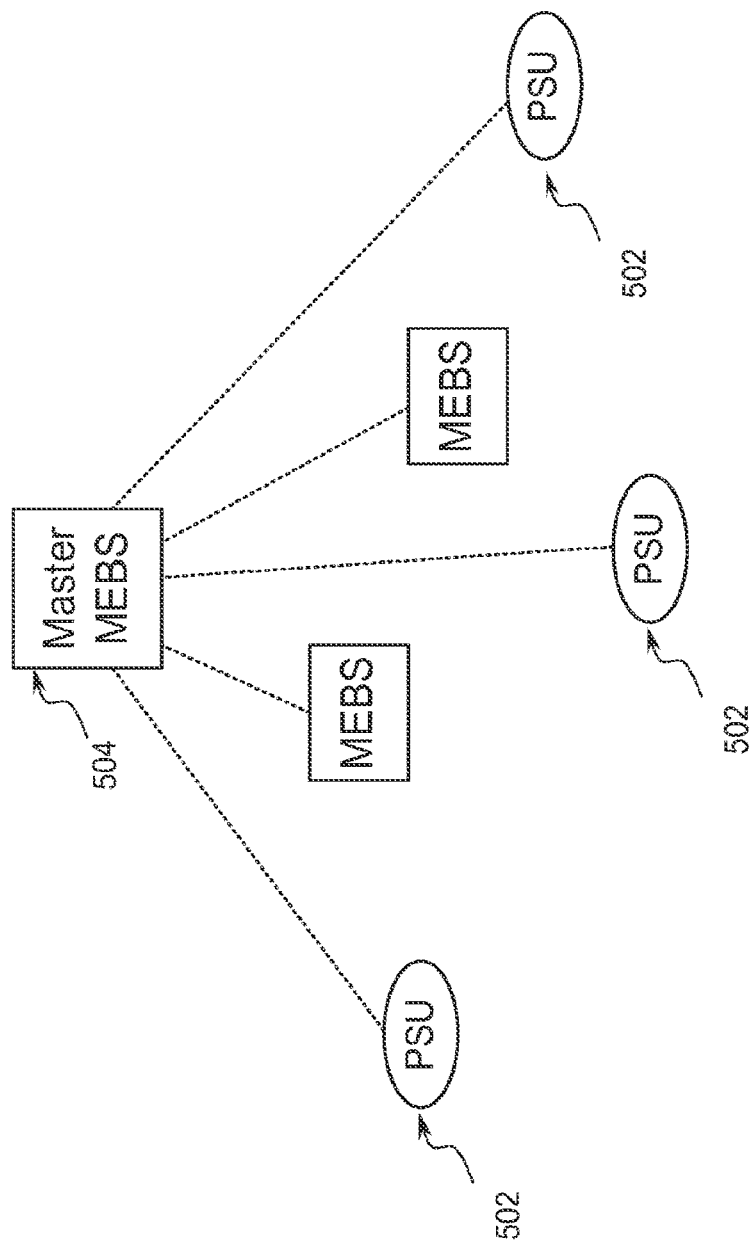
FIG. 5 is a graphical depiction of direct connection of the PSU's to the master MEBS

A group of PSU's 404 may be associated only with a particular MEBS 402 to form a cluster 406, as depicted in FIG. 4. The MEBS directly communicates with its PSU's to provide coordination and instructions. Alternatively, PSU's 502 may be directly associated with the master MEBS 504, which directly communicates with the PSU's 502 to provide coordination and instructions, as depicted in FIG. 5.

In one embodiment, a MEBS may receive data from a normal radio network that was or is running in the neighborhood of disaster area. The data may include information about subscribers that are registered on, associated with, or resided within, whether actively or inactively, the normal radio network. The MEBS utilizes the information to assist its search and rescue functions.

An emergency network may be used in parallel with a normal radio network or in place of a normal radio network if the latter has collapsed during a disaster.

Signal Formats and Structure

Beacon signals may be transmitted by a MEBS over a DL broadcast channel. The beacon signals may be relayed or repeated by a PSU or a PT. A beacon signal may contain information for the PT to perform receiving functions (e.g., synchronization in time and frequency, and channel estimation) and messages and instructions to the PT's (e.g., UL multiple access and control, and acknowledgement of reception of distress signals).

Probing signals may be transmitted by a MEBS or PSU to an individual PT or a specific group of PT's. A probing signal may contain the unique identification of the PT or the group of PT's. The probing signals may be relayed or repeated by a PT. A probing signal may contain information for the PT to perform receiving functions (e.g., synchronize in time and frequency, and channel estimation) and messages and instructions to the PT (e.g., UL multiple access and control, and acknowledgement of reception of distress signals).

A beacon signal or probing signal may be shaped to provide the capability to penetrate structures in a disaster environment, such as collapsed buildings. In one embodiment, a beacon signal or a probing signal may be a spread-spectrum signal with high spreading gain or coding gain.

Distress signals may be transmitted by PT's on UL channels to a MEBS or a PSU. The distress signals may be relayed or repeated by a PT. A distress signal may contains essential data about its carrier, such as the carrier's biometrics (or life signs: temperature, heart beats, blood pressure, movement, key pressing, etc.), its location (e.g., from GPS), carrier's identification, and other data. A distress signal may contain pilot signals to assist the MEBS or PSU with signal reception.

A beacon signal, probing signal, or a distress signal may occupy a frequency band designated for search and rescue during an emergency state, or may occupy or overlay on a frequency band used by a normal radio network.

TDD

Figure 6:
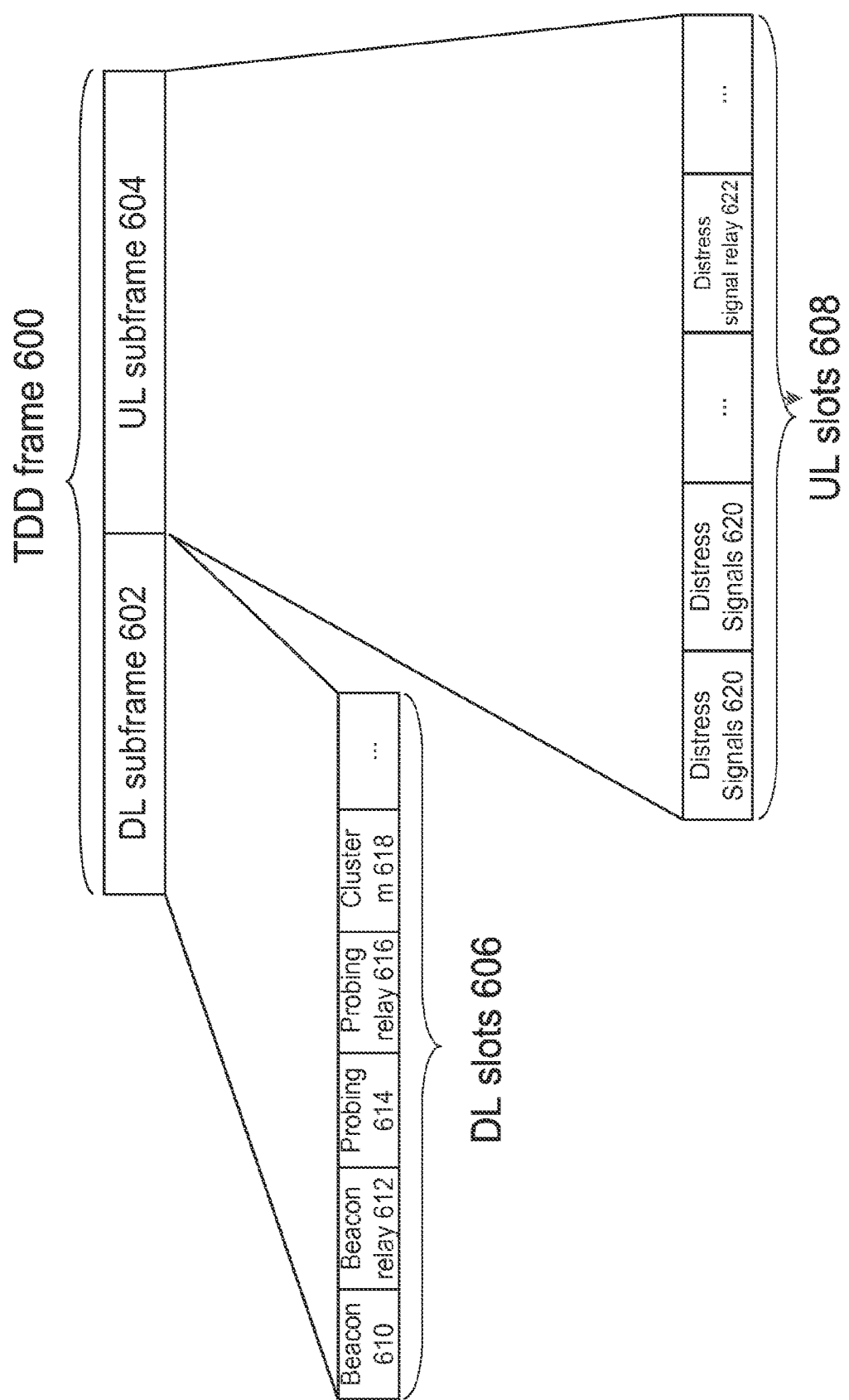
FIG. 6 is a graphical representation of the TDD frame structure.

In the time-division-duplex (TDD) case, a transmission frame 600 consists of two subframes, one for DL transmission 602 and the other for UL transmission 604, as depicted in FIG. 6. It should be noted here that the term "frame" is only a time unit of a specific duration. It is used for better understanding and illustration of the methods and processes. Following a DL subframe, there is a relatively short time period provided as guard time for transition from DL to UL and following a UL subframe, there is another relatively short time period provided as guard time for transition from UL to DL. A UL subframe may be substantially longer than the DL subframe.

DL subframe 602 may be divided into multiple DL slots 606. One or more slots may be assigned for transmission of beacon signals 610 by the MEBS's. One or more slots may be used for retransmission or relay of beacon signals 612 by a MEBS, PSU, or/and PT. One or more slots may be assigned for transmission of probing signals 614 or probing relay 616 by a MEBS or PSU. One or more slots may be allocated for the use by the MEBS and PSU's in a cluster 618.

UL subframe 604 may be divided into multiple UL slots 608. One or more slots may be assigned for transmission of distress signals 620 by the PT's. One or more slots may be used for retransmission or replay of distress signals 622 by a PSU or/and PT. A UL slot is not necessarily of the same length as a DL slot.

FDD

Figure 7:
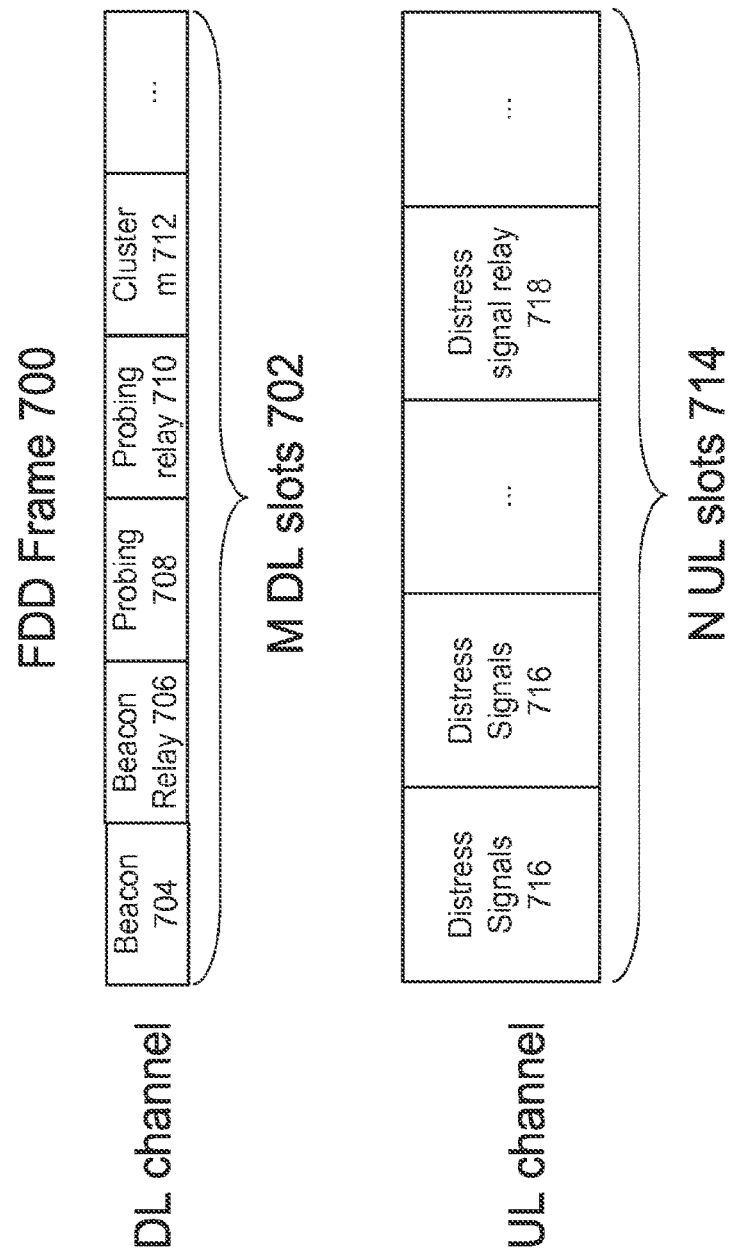
FIG. 7 is a graphical representation of the FDD frame structure.

In the frequency-division-duplex (FDD) case, DL transmission and UL transmission are carried out in two different frequency bands. A band for UL transmission may be substantially wider than that for DL transmission. A FDD transmission frame 700 consists of multiple slots, as depicted in FIG. 7.

In some embodiments, the frame length is the same for both the DL and UL, but a UL slot does not necessarily have the same length as a DL slot, as long as the following condition is met:

$$L_{DL} \cdot M = L_{UL} \cdot N$$

where $L_{DL}$ denotes the length of a DL slot and $L_{UL}$ denotes the length of a UL slot, and M and N are positive integers.

In other embodiments, the DL frame length may be different from the UL frame length. One or more DL slots 702 may be assigned for transmission of beacon signals 704 by the MEBS's. One or more slots may be used for retransmission or replay of beacon signals 706 by a MEBS, PSU, or/and PT. One or more slots may be assigned for transmission of probing signals 708 or probing relay signals 710 by a MEBS or PSU. One or more slots may be allocated for the use by the MEBS and PSU's in a cluster 712.

One or more UL slots 714 may be assigned for transmission of distress signals 716 by the PT's. One or more slots may be used for retransmission or relay of distress signals 718 by a PSU or/and PT.

Multiple Access

DL Transmission

Multiple MEBS's may transmit or retransmit the same beacon signal at substantially the same time and over the same frequency channel.

Multiple PSU's and PT's may relay the same beacon signal at substantially the same time and over the same frequency channel.

The master MEBS may provide schedules to other MEBS's and PSU's to coordinate the transmission of probing signals. The scheduling may be based on a first-come-first-service policy for the probing-signal-sending requests by the MEBS's and PSU's, or based on a priority set by a predefined set of criteria. For example, a higher priority may be given to the MEBS or PSU that is to probe a PT of critical biometrics or low battery levels.

UL Transmission

A UL channel may consist of multiple subchannels in time, frequency, code, or a combination thereof. UL multiple access can be provided using TDMA (time division multiple access), FDMA (frequency division multiple access), CDMA (code division multiple access), CSMA (carrier sense multiple access), etc.

Unlike in a traditional cellular network where mobile devices enter the network gradually (instead of joining network in a burst), a large number of PT's may respond to a beacon signal in a burst. Therefore, it is important to design the initial uplink signaling, e.g., random access, to avoid frequent collisions of uplink signals.

In some embodiments, the beacon or probing signals may contain messages for UL multiple access instructions for the PT's. The message may instruct a group of PT's with certain common attributes to transmit their distress signals at specific UL slots, using specific codes, or/and via specific subchannels in the time, frequency, or code domains, or a combination thereof. The common attributes may be the physical characteristics or the identifications of the PT's. For example, a group PT's may have the same last hex number in the MAC address or the last two digits of their identification may fall within a specified range. The assignment of slots, codes, or subchannels to the PT's can be in a particular order, in a random order, or other prescribed means. An assignment example is given in the table below.

| Attribute | Slot # | Subchannel # | Code # |
|---|---|---|---|
| xxx01 | 1 | 1 | 1 |
| xxx02 | 1 | 1 | 2 |
| ... | 1 | 1 | ... |
| xxx10 | 1 | 1 | 10 |
| xxx11 | 2 | 1 | 1 |
| ... | 2 | 1 | ... |
| xxx20 | 2 | 1 | 10 |
| ... | ... | ... | ... |
| xxx97 | m | N | 7 |
| xxx98 | m | N | 8 |
| ... | ... | ... | ... |

In an embodiment, the UL multiple-access instruction may contain the priority for the UL transmission of distress signals based on the received signal strength or SNR (signal-to-noise ratio) of the DL signals, the remaining battery level of the PT's, the biometrics of the PT carriers, or other criteria.

In one embodiment, the MEBS can access a database that maps the identities of users/subscribers residing on traditional/normal cellular networks and the identities of PT's. The MEBS may utilize the information it obtains from the data base about residing users (e.g., the identities in the neighborhood) to instruct the PTs regarding multiple access. For example, the MEBS can divide the residing users and corresponding PTs into a plurality of groups, and assign different radio resources for different groups for random access or sending distressed signals.

Network Overlay

In some embodiments of the invention, the emergency network may be overlaid temporally and locally, on top of an existing/normal radio network or cellular wireless network for non-emergency-applications (e.g., audio broadcast, TV broadcast, and land mobile radio).

Figure 8:
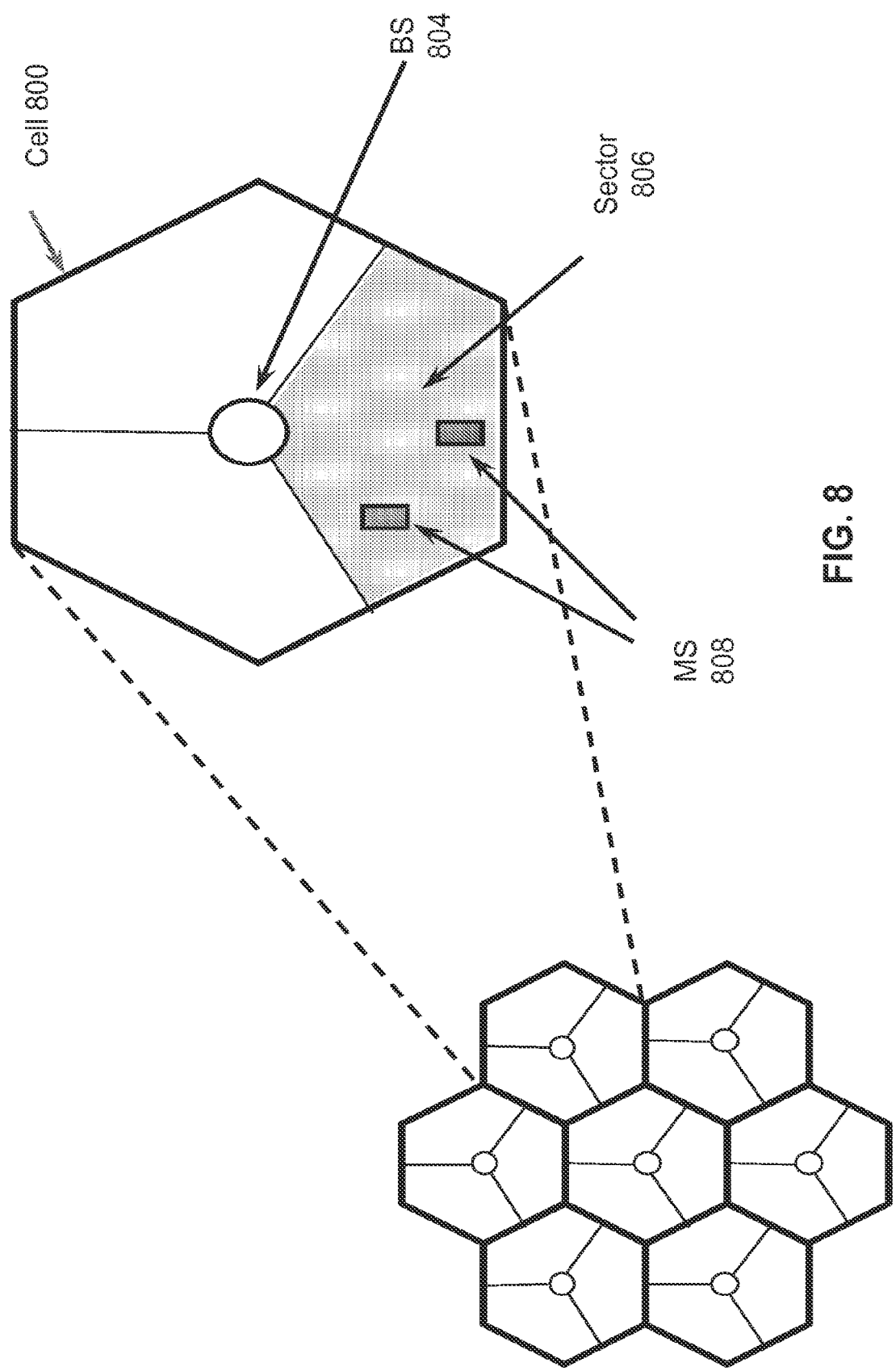
FIG. 8 illustrates an example cellular wireless network.

Referring to FIG. 8, in a normal cellular wireless network, the geographical region to be serviced by the network is normally divided into smaller areas called cells 800. In each cell 800, coverage is provided by a base station (BS) 804. Thus, this type of structure is normally referred to as a cellular structure, as shown in FIG. 8. Within each coverage area, there are located mobile stations (MS's) 808 to be used as an interface between the users and the network. BS 804 is connected to the backbone of the network, usually by a dedicated link. Base station 804 also serves as a focal point to distribute information to and collect information from its mobile stations by radio signals. A cell can also be divided into sectors 806. From a system engineering point of view each sector can be considered a cell. In this context, the terms "cell" and "sector" are interchangeable.

For a wireless network using multicarrier transmission scheme, such as orthogonal frequency division multiplex (OFDM), the physical media resource (e.g., radio or cable) can be divided in both the frequency and time domains. This division provides high flexibility and fine granularity for resource sharing.

One or more normal channels allocated for the existing radio network can be converted and aggregated into a broadcast channel for transmitting the beacon or probing signals by the MEBS's and PSU's. Normal channels may be those used in normal (non-emergency) applications, such as commercial radio/TV broadcasting or land mobile communications.

Figure 9:
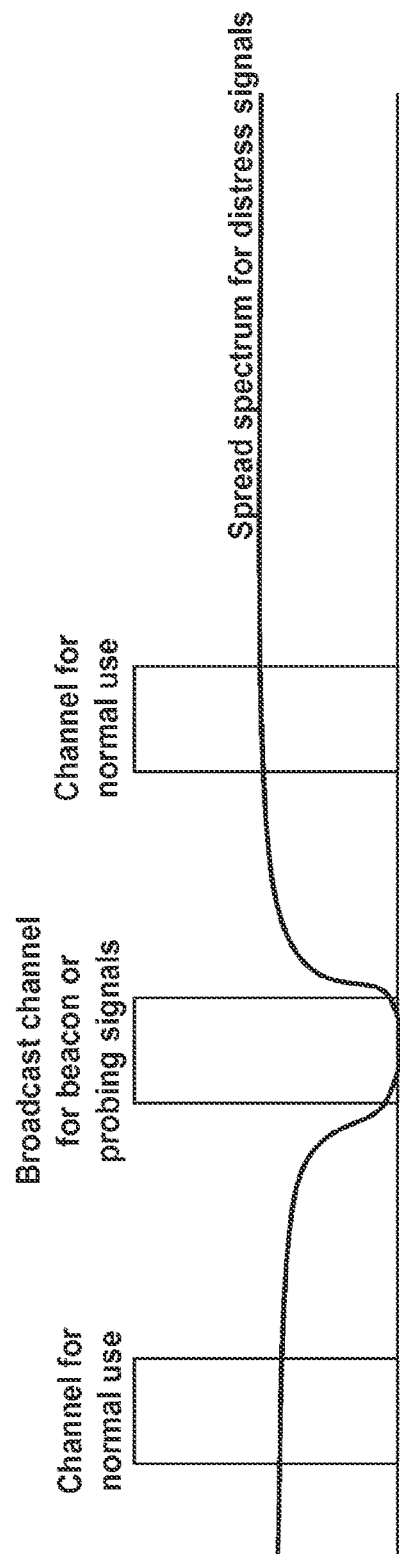
FIG. 9 is a graphical depiction of spectral signals in an overlay network.

The distress signal transmitted by a PT may be spread across the available spectrum or a spectrum substantially wider than the broadcast channel for the beacon and probing signals. Spectral valleys created in the overlaid signal to reduce interference with the broadcast channel or other channels may also be used, as shown in FIG. 9

The spectral nulls can be achieved either by filtering in the time domain or by suppressing some subcarriers in the frequency domain.

In other embodiments, normal channels used by an existing/normal network can be vacated for use by the emergency network. A MEBS or a PT may operate in the same frequency band as used by a normal radio network employing a 2G, 3G, or 4G technology such as GSM, WCDMA, or LTE. In-band signaling may be used for the emergency network. Alternatively, the emergency network may operate in a frequency band different from operation frequency bands of a normal radio network.

An existing/normal radio network can temporally, partially, and/or locally be reconfigured or switched to emergency operation mode. For example, a group of the base stations in a disaster zone may be reconfigured or switched by the network operator to serve as MEBS's. These base stations may transmit or retransmit the same beacon signal or emergency signal at substantially the same time using the same frequency channels.

In some embodiments, an LTE system can be reconfigured into a search and rescue system in the downlink, the primary synchronization signal (PSS), the secondary synchronization signal (SSS), and/or the physical broadcast channel (PBCH) may be repeated in multiple, preferably consecutive, OFDM symbols to increase SNR and penetration. Alternatively, the bandwidth for the PSS, SSS, and PBCH may be widened by increasing the length of a Zadoff-Chu sequence or by repeating a Zadoff-Chu sequence in the frequency domain. Similarly, in the uplink, a random access signal or a sounding reference signal (SRS) may be repeated in the time domain (e.g., multiple, preferably consecutive, OFDM symbols or time slots). Alternatively, the bandwidth for the random access signal or SRS and the PBCH may be widened by increasing the length of a Zadoff-Chu sequence or by repeating a Zadoff-Chu sequence in the frequency domain.

Communications Between MEBS's

The communications between MEBS's may make use of an existing data communication protocol. Information sent by a MEBS to another MEBS may include its own location coordinates, the partial or complete identification of a PT, the PT's location coordinates, the corresponding biometrics, or/and the attributes of the corresponding distress signal (e.g., angle-of-arrival and time-of-arrival).

In an embodiment, a MEBS may send a request for transmission of probing signals to the master MEBS, which in return provides the schedule for the MEBS to transmit the probing signals.

Communications Between MEBS's and PSU's

The communications between MEBS's and PSU's may make use of an existing data communication protocol. Information sent by a MEBS to a PSU or vice versa may include its own location coordinates, partial or complete identification of a PT, the PT's location coordinates, the corresponding biometrics, or/and the attributes of the corresponding distress signal (e.g., angle-of-arrival and time-of-arrival).

In an embodiment, a PSU may send a request for transmission of probing signals to the master MEBS, which in return provides the schedule for the PSU to transmit the probing signals.

Operations

Beacon signals may be periodically broadcast via the DL channel. A MEBS may transmit the beacon signals using a wide antenna beam in a PT-sparse area or by scanning through a PT-dense area using a narrow antenna beam The PT's may respond by transmitting their distress signals via the UL channels in a manner as instructed by the beacon signals. If a PT is equipped with a GPS receiver or other location determination capability, the PT may include its latest coordinates in the distress signal. In addition, the MEBS or PSUs may seek to locate the PT through detection of arrival time or receiving power of the distress signal transmitted from the PT. Multiple MEBS or PSUs at different locations may work in collaboration to locate the PT.

In one embodiment, once a PT receives a beacon or probing signal that indicates a disaster state, the PT may enter into a distress state and automatically transmit a distress signal. The PT may also inform or control the host device to enter into a power saving mode for extended battery life by turning off non-essential functions that consume power. For example, the host device may terminate processes for entertainment functions, such as video-rich operations or large file downloading, that consume a large amount of power.

Upon the detection of a beacon signal, a PT or its host device may fall back from an advanced communication operation to a rudimentary operation (e.g., from LTE to 3G or GSM or from 3G to GSM) for reducing power consumption.

In one embodiment, a host device may comprise a special man-machine interface for human initiation of transmitting distress signals, with or without reception of a beacon signal, from the MEBS or PSU. For example, a host device may have a special button or an icon on its display screen that a human can push/touch to activate sending a distress signal. The information contained in the distress signal may be automatically generated or configured by network or by the carrier/operator of the host device.

A PT may return to a normal state after it receives a signal from MEBS, its host device receives an instruction from the traditional/normal radio network, or by human interaction.

MEBS's may detect the distress signals over the UL channels. Once a distress signal from a PT is detected successfully by a MEBS, the MEBS may proceed to decode the information carried by the signal and to extract the attributes associated with the signal. The MEBS may then report the data and information associated with this PT to the master MEBS, which may combine the data and information from other MEBS's to determine the PT's complete identification, its location, biometrics, and its priority for rescue. The master MEBS may then register the PT with the corresponding data and registry information. The registry, which is maintained by the master MEBS, may be a table consisting of entries of the identification of the PT, its location, its biometrics information, its priority for rescue, and its rescue status. Once the PT has been registered, an acknowledgement message is embedded in a beacon signal to be transmitted by the MEBS's. The master MEBS may periodically send the updated registry to MEBS's.

Once a PT has received the acknowledgement, the PT may be configured such that it will not transmit the distress signal even if it belongs to a group that a beacon signal calls for to transmit. The PT remains silent until it is probed by a MEBS or PSU with a probing signal. Those PT's that have not received the acknowledgement will continue to listen to the beacon signal for instructions to retransmit their distress signals.

Based on the information in the registry, a MEBS may determine if it will instruct its PSU's to act. For example, if the PT is located within the coverage area of a particular MEBS with high priority, this MEBS will dispatch one of its PSU's to approach the PT and to pinpoint its exact location for rescue.

The PSU may transmit a probing signal by pointing its high-directivity antenna toward the direction of the PT. Once the PT hears the probing signal, it will respond by transmitting a distress signal. Based on the distress signal, the PSU may find the exact location of the PT for the rescue. There are a number of ways to determine the status of the person/owner associated with this PT. If the PT signal level increases significantly or if the location of this PT changes significantly, it is likely that the person/owner has been found and the PSU may report the rescue status. The status can also be reported manually.

To distinguish a PT of a disaster victim from a non-victim, certain criteria can be applied. For example, if the speed of the movement of a PT is above a specified threshold and/or its range of movement is greater than a specified threshold, it may be considered unlikely that this particular PT is carried by a disaster victim When an overriding input (e.g., a key sequence, voice command, or gesture) is entered by its carrier, the PT may be configured so that it will not respond to the beacon or probing signal and/or send a signal to indicate that this PT is carried by a non-victim In some embodiments, a MEBS or a computer server connected to one or more MEBS may receive and store information for users that have resided or currently reside in one or more traditional/normal radio networks that provide data or voice service to subscribers in the same neighborhood. The normal radio networks may be operated by different service providers, with possibly different technologies. For example, one service provider/operator may use GSM technology, while another service provider/operator may use a CDMA technology. Some or all of the mobile devices serviced by an operator may contain one or more PTs. The MEBS may transmit beacon signals or probing signals to PTs, and detect feedback signals such as distressed signals transmitted from PTs. The MEBS or the computer server may then compare the list of users that resided on normal radio networks (before a disaster), the list of responding PTs, and/or the list of users that are identified through other methods, e.g., bulletin board, manual check-in, or hospital reports. The results of the comparison results may be used to direct search and rescue efforts.

As an example, consider a person with a mobile device that was residing on a normal radio network in a neighborhood, the mobile device being equipped with a PT. The MEBS receives a distress signal from the PT over the emergency network. If the person is located or identified, then the person is marked as located in the user list maintained by the MEBS or the computer server. If a user in the list is still marked missing, a message may be sent over the emergency network to request manual feedback from the user, either through voice, video, or the data interface. A key function or touch screen function may be pre-configured for easy operation by the person (possibly severely wounded) to send feedback. Alternatively, the sensors in the PT or mobile device may automatically or remotely controlled to detect or record any vital signs such as sound, temperature, or pulses, record audio signals via its microphone, or record a video signal via its camera sensor. The PT or mobile device may then automatically or be remotely commanded to transmit the signals related to the recorded signals, audio signals, or video signals (possibly with compression and encoding) to the MEBS. The above actions may be conducted repeatedly to improve results.

The data received from the PT and/or location information obtained via the emergency network may be provided to rescue teams to improve search and rescue efforts. If one or more normal radio networks are still functioning after a disaster, these normal radio networks and the emergency network can collaborate to provide better results.

In some embodiments, a PT may have three operation modes: normal mode, semi-stress mode, and stress mode. A PT in normal mode may enter into semi-stress mode based on one or more conditions, such as loss (sudden or for an extended period) of normal radio network signals. A PT in normal or semi-stress mode may enter into stress mode after detection of a beacon signal indicating an emergency state from a MEBS or PSU, or after input from human interaction. On the other hand, based on human interaction or input, a PT may change modes from stress mode or semi-stress mode to normal mode. A PT may be configured to function differently in different modes. For example, a PT in semi-stress mode may increase the frequency of wake-up for detection of beacon signals from MEBS. A PT in the stress mode may automatically configure its residing mobile device into power saving mode to extend battery life.

In other embodiments, a MEBS may have two operational modes: normal mode and stress mode. In normal mode, a MEBS may broadcast beacon signals indicating a normal environment and receive or detect signals from PTs seeking special help. In stress mode, a MEBS may broadcast beacon signals indicating an emergency state and receive or detect stress signals from PTs.

Figure 10:
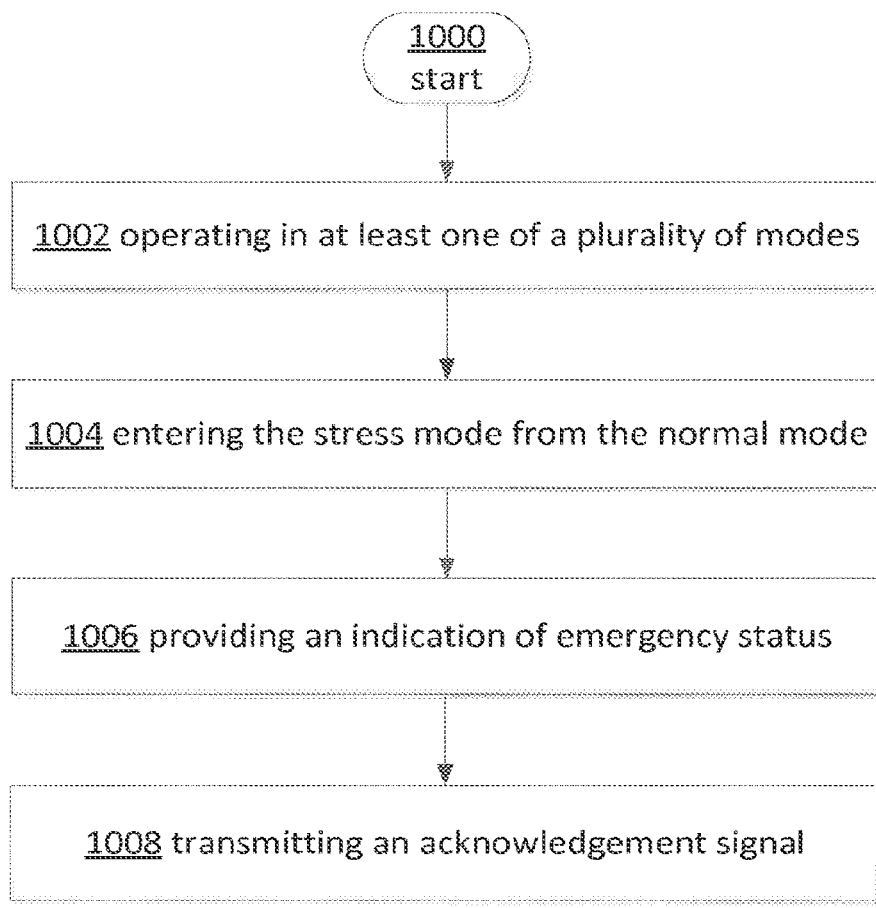
FIG. 10 illustrates an example of an operational procedure for practicing aspects of the present disclosure.

FIG. 10 depicts an exemplary operational procedure for providing communications including operations 1000, 1002, 1004, 1006, and 10008. In one embodiment, the procedure may be performed by a portable device operating in a wide area communication system such as a cellular voice or data network.

Referring to FIG. 10, operation 1000 begins the operational procedure and operation 1002 illustrates operating in at least one of a plurality of modes. In an embodiment, the plurality of modes includes a normal mode and a stress mode. In another embodiment, the plurality of modes includes a semi-stress mode. In one embodiment, the portable device may enter the stress mode from the normal mode in response to a user input received via a user interface on the portable device. Additionally, and optionally the portable device may enter the normal mode from the stress mode in response to the user input.

In one embodiment, the portable device may enter the semi-stress mode from the normal mode in response to the portable device losing its connection to a cellular voice or data network. Furthermore, the portable device may increase the frequency with which it detects the beacon signal in the semi-stress mode, as compared to the frequency with which it detects the beacon signal in the normal mode.

In one embodiment, the portable device may operate in the stress mode with a battery physically or operationally separate from a battery for operation in a normal mode.

In one embodiment, the portable device may operate in the stress mode with less power than in the normal mode. The portable device may also fall back from an advanced communication operation to a rudimentary operation in response to entering the stress mode. For example, the portable device may fall back from LTE or 3G operation to GSM operation upon entering the stress mode Operation 1004 illustrates entering the stress mode from the normal mode in response to receiving a beacon signal indicating an emergency status.

Operation 1006 illustrates providing an indication on the portable device of the emergency status via an audio, visual, or mechanical user interface during the stress mode.

Operation 1008 illustrates transmitting an acknowledgement signal in response to the beacon signal. In one embodiment, the acknowledgement signal may indicate information selected from a group comprising: identity of the portable device, position of the portable device, and biometrics of the user or carrier of the portable device. The portable device may also receive a scheduling signal containing information indicating instructions for transmitting the acknowledgement signal.

In some embodiments, a user or carrier of the portable device may be prompted to report the user or carrier's safety or medical status. Furthermore, the portable device may transmit a stress signal in response to determining that a time out indicating failure to receive user input has exceeded a predetermined value.

In an embodiment, the portable device may further receive and act upon an instruction to activate a monitoring device on the portable device.

Figure 11:
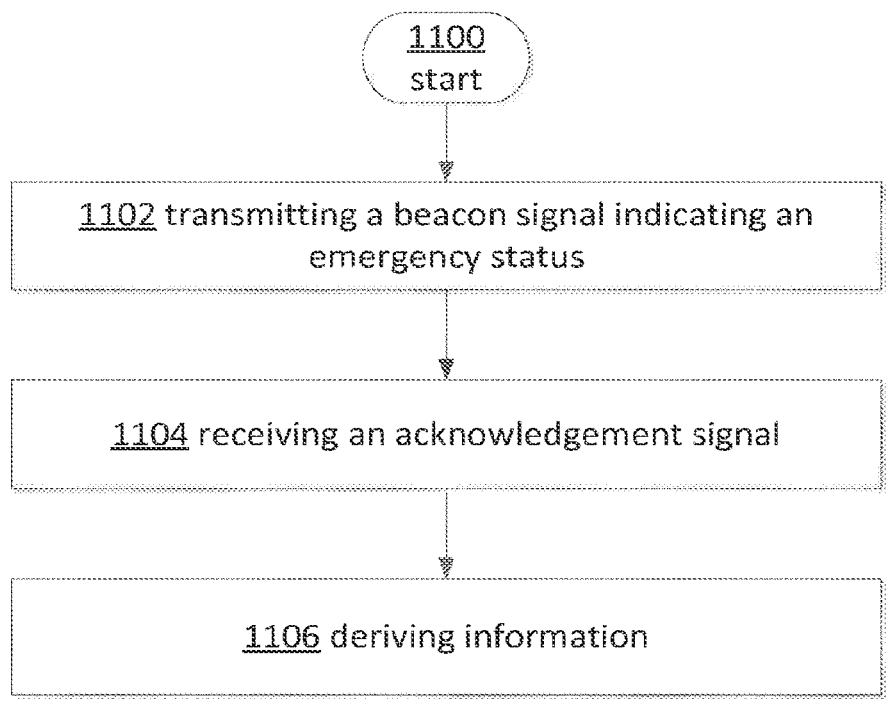
FIG. 11 illustrates an example of an operational procedure for practicing aspects of the present disclosure.

FIG. 11 depicts an exemplary operational procedure for providing communications including operations 1100, 1102, 1104, and 1106. In one embodiment, the procedure may be performed by a base station in a network comprising base stations and portable devices. The network may be, for example, a wide area communication system such as a cellular voice or data network.

Referring to FIG. 11, operation 1100 begins the operational procedure and operation 1102 illustrates transmitting a beacon signal indicating an emergency status to a portable device. In one embodiment, the beacon signal may be usable by the portable device to determine whether to enter a stress mode. In an embodiment, the beacon signal may generate to facilitate in-building penetration of the transmitted beacon signal. For example, the beacon signal may be a spread-spectrum signal with high spreading gain or coding gain.

In some embodiments, the acknowledgement signal may carry information that may comprise the identity of the portable device, the position of the portable device, and/or biometrics of a carrier or user of the portable device.

Operation 1104 illustrates receiving an acknowledgement signal from the portable device in response to the beacon signal.

Operation 1106 illustrates deriving from the received acknowledgement signal information associated with the portable device or a carrier of the portable device.

In an embodiment, the base station may also transmit an instruction to activate a monitoring device on the portable device. In other embodiments, the base station may transmit a scheduling signal containing information indicating instructions for transmitting the acknowledgement signal. In further embodiments, the base station may access a database or a list of subscribers of a cellular network covering a geographical area near or overlapping with a geographical area covered by the base station.

Lastly, while the present disclosure has been described in connection with the preferred aspects, as illustrated in the various figures, it is understood that other similar aspects may be used or modifications and additions may be made to the described aspects for performing the same function of the present disclosure without deviating there from, for example, in various aspects of the disclosure, methods and systems for communicating in a wireless communications system were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed is:

1. A land vehicle comprising:
a wireless transceiver; and
a processor; wherein:
the wireless transceiver and the processor are configured to:
transmit, to other wireless devices, a primary synchronization signal, having a first sequence, in a first orthogonal frequency division multiplex (OFDM) symbol and the primary synchronization signal repeated in a second OFDM symbol consecutive with the first OFDM symbol;
transmit, to the other wireless devices, a secondary synchronization signal, having a second sequence, in a third OFDM symbol and the secondary synchronization signal repeated in a fourth OFDM symbol consecutive with the third OFDM symbol; and
directly communicate information with at least one of the other wireless devices.

2. The land vehicle of claim 1, wherein the wireless transceiver and the processor are configured to store data about wireless devices in a vicinity of the land vehicle.

3. The land vehicle of claim 1, wherein the wireless transceiver is mounted to the land vehicle.

4. The land vehicle of claim 1, wherein another land vehicle includes one of the other wireless devices.

5. The land vehicle of claim 1, wherein the directly communicated information is based on surrounding environment data from the at least one of the other wireless devices.

6. The land vehicle of claim 1, wherein the directly communicated information is based on optical sensing information sensed at the at least one of the other wireless devices.

7. The land vehicle of claim 1, wherein the directly communicated information is based on motion information sensed at the at least one of the other wireless devices.

8. The land vehicle of claim 1, wherein the directly communicated information is based on orientation information sensed at the at least one of the other wireless devices.

9. The land vehicle of claim 1, wherein the directly communicated information is based on location information sensed at the at least one of the other wireless devices.

10. The land vehicle of claim 1, wherein the wireless transceiver and the processor are configured to directly communicate the information with the at least one of the other wireless devices by transmitting wireless signals to the at least one of the other wireless devices.

11. The land vehicle of claim 1, wherein the wireless transceiver and the processor are configured to directly communicate the information with the at least one of the other wireless devices in a frequency band not used for cellular transmissions with cellular base stations.

12. The land vehicle of claim 1, wherein the directly communicated information is synchronized based on the primary synchronization signal and the secondary synchronization signal.

13. The land vehicle of claim 1, wherein the directly communicated information includes an identifier that identifies a group of wireless devices.

14. The land vehicle of claim 1, wherein the wireless transceiver and the processor are configured to directly communicate the information with the at least one of the other wireless devices by transmitting wireless signals to the at least one of the other wireless devices and to receive wireless signals from the at least one of the other wireless devices.

15. The land vehicle of claim 1, wherein the wireless transceiver and the processor are configured to directly communicate the information with the at least one of the other wireless devices in a frequency band that overlaps with frequency resources used for cellular transmissions with cellular base stations.

16. The land vehicle of claim 1, wherein the direct communication of the information includes the wireless transceiver and the processor receiving, from the at least one of the other wireless devices, a distress signal indicating an emergency event.

17. The land vehicle of claim 16, wherein the wireless transceiver and the processor receive the distress signal indicating the emergency event in a frequency band designated for an emergency state.

18. The land vehicle of claim 1, wherein the wireless transceiver and the processor are further configured to observe a surrounding environment using the directly communicated information based on surrounding environment data from the at least one of the other wireless devices.

19. The land vehicle of claim 1, wherein the wireless transceiver and the processor are further configured to provide a wide-angle view of a surrounding environment using the directly communicated information based on surrounding environment data from the at least one of the other wireless devices.

20. The land vehicle of claim 1, wherein the directly communicated information includes a video signal.

21. The land vehicle of claim 1, wherein the wireless transceiver and the processor and each of the other wireless devices are configured to directly communicate information with each other.

22. The land vehicle of claim 21, wherein the directly communicated information includes coordination information.

23. The land vehicle of claim 21, wherein the directly communicated information includes instructions.

24. The land vehicle of claim 21, wherein the other wireless devices have common attributes.

25. The land vehicle of claim 24, wherein the common attributes include common physical characteristics.

26. The land vehicle of claim 24, wherein the common attributes include common identifications.

27. The land vehicle of claim 21 further comprising a local memory, wherein the wireless transceiver and the processor are configured to store in the local memory information for the other wireless devices.

28. The land vehicle of claim 21, wherein the directly communicated information includes search and rescue information.

29. The land vehicle of claim 21, wherein the directly communicated information includes location information of a person in distress.

30. The land vehicle of claim 21, wherein the directly communicated information includes biometric information of a person in distress.

31. The land vehicle of claim 21, wherein the wireless transceiver and the processor are further configured to determine a location of a victim based on the directly communicated information.

32. The land vehicle of claim 1, wherein the direct communication of the information includes the wireless transceiver and the processor transmitting control information to the at least one of the other wireless devices, the control information indicating to the at least one of the other wireless devices to perform a function.

33. The land vehicle of claim 32, wherein the control information indicates terminating a process at the at least one of the other wireless devices.

34. The land vehicle of claim 1, wherein the wireless transceiver and the processor are further configured to:
receive, from a base station, control information; and
perform a function in response to the control information.

35. The land vehicle of claim 1, wherein the wireless transceiver and the processor are further configured to:
transmit a second primary synchronization signal and transmit a second secondary synchronization signal in operating frequency bands for normal operation, wherein the primary synchronization signal and the second secondary synchronization signal are transmitted in an operating frequency band different from the operating frequency bands for normal operation.

36. A system comprising:
a first land vehicle comprising a wireless transceiver and a processor; and
a wireless device; wherein:
the wireless transceiver and the processor of the first land vehicle are configured to:
transmit, to a wireless device, a primary synchronization signal, having a first sequence, in a first orthogonal frequency division multiplex (OFDM) symbol and the primary synchronization signal repeated in a second OFDM symbol consecutive with the first OFDM symbol;
transmit, to the wireless device, a secondary synchronization signal, having a second sequence, in a third OFDM symbol and the secondary synchronization signal repeated in a fourth OFDM symbol consecutive with the third OFDM symbol;
the wireless device is configured to receive the primary synchronization signal and receive the secondary synchronization signal; and
the wireless transceiver and the processor of the first land vehicle and the wireless device are configured to directly communicate information with each other.

37. The system of claim 36, wherein the wireless device comprises:
a second processor; and
a surrounding environment sensor configured to output surrounding environment data to the second processor, wherein the directly communicated information is based on the output surrounding environment data.

38. The system of claim 37, wherein the surrounding environment sensor comprises an optical sensor configured to output optical sensing information to the second processor, and wherein the directly communicated information is based on the output optical sensing information.

39. The system of claim 38, wherein the surrounding environment sensor comprises at least two optical sensors and wherein the output optical sensing information is sampled from two or more angles.

40. The system of claim 38, wherein the wireless device further comprises:
a motion sensor configured to output motion information to the second processor; and
a global positioning system (GPS) receiver configured to output location information to the second processor, wherein the directly communicated information is based on the output motion information, the output location information, and the output optical sensing information.

41. The system of claim 37, wherein the wireless transceiver and the processor of the first land vehicle are further configured to observe the surrounding environment using the directly communicated information based on the output surrounding environment data from the wireless device.

42. The system of claim 37, wherein the wireless transceiver and the processor of the first land vehicle are further configured to provide a wide-angle view of the surrounding environment using the directly communicated information based on the output surrounding environment data from the wireless device.

43. The system of claim 37, wherein the surrounding environment sensor comprises a video sensor configured to output video sensing information to the second processor, and wherein the directly communicated information includes a video signal.

44. The system of claim 36, wherein the wireless device comprises:
a second processor; and
a mechanical device, wherein data relating to the mechanical device is output to the second processor.

45. The system of claim 36, wherein the wireless device comprises:
a second processor; and
a touch screen configured to, in response to a touch screen input, output distress information to the second processor.

46. The system of claim 36, wherein the wireless device comprises:
a second processor; and
a motion sensor configured to output motion information to the second processor, wherein the directly communicated information is based on the output motion information.

47. The system of claim 36, wherein the wireless device comprises:
a second processor; and
an orientation sensor configured to output orientation information to the second processor, wherein the directly communicated information is based on the output orientation information.

48. The system of claim 36 wherein the wireless device comprises:
a second processor; and
a global positioning system (GPS) receiver configured to output location information to the second processor, wherein the directly communicated information is based on the output location information.

49. The system of claim 36, wherein the wireless transceiver and the processor of the first land vehicle and the wireless device are configured to directly communicate the information with each other in a frequency band not used for cellular transmissions with cellular base stations.

50. The system of claim 36, wherein the wireless transceiver and the processor of the first land vehicle and the wireless device are configured to directly communicate the information with each other in a frequency band that overlaps with frequency resources used for cellular transmissions with cellular base stations.

51. The system of claim 36, wherein the wireless transceiver and the processor of the first land vehicle and the wireless device are configured to synchronize the direct communication of the information based on the primary synchronization signal and the secondary synchronization signal.

52. The system of claim 36, wherein the communicated information includes an identifier that identifies a group of wireless devices including the wireless device.

53. The system of claim 36, the wireless transceiver and the processor of the first land vehicle and the wireless device are configured to directly communicate information with each other by transmitting wireless signals and receiving wireless signals.

54. The system of claim 36, wherein another land vehicle includes the wireless device.

55. The system of claim 36 further comprising:
a plurality of wireless devices including the wireless device, wherein the wireless transceiver and the processor of the first land vehicle are configured to transmit the primary synchronization signal to the plurality of wireless devices and transmit the second synchronization signal to the plurality of wireless devices.

56. The system of claim 55, wherein the wireless transceiver and the processor of the first land vehicle and each of the plurality of wireless devices are configured to directly communicate information with each other.

57. The system of claim 56, wherein the directly communicated information includes coordination information.

58. The system of claim 56, wherein the directly communicated information includes instructions.

59. The system of claim 56, wherein the plurality of wireless devices have common attributes.

60. The system of claim 59, wherein the common attributes include common physical characteristics.

61. The system of claim 59, wherein the common attributes include common identifications.

62. The system of claim 56, wherein the first land vehicle further comprises local memory, and wherein the wireless transceiver and the processor of the first land vehicle are configured to store in the local memory information for the plurality of wireless devices.

63. The system of claim 56, wherein the directly communicated information includes search and rescue information.

64. The system of claim 56, wherein the directly communicated information includes location information of a person in distress.

65. The system of claim 56, wherein the directly communicated information includes biometric information of a person in distress.

66. The system of claim 56, wherein the wireless transceiver and the processor of the first land vehicle are further configured to determine a location of a victim based on the directly communicated information.

67. The system of claim 36, wherein the direct communication of the information includes the wireless transceiver and the processor of the first land vehicle receiving an emergency status indication from the wireless device and the wireless transceiver and the processor of the first land vehicle transmitting an acknowledgement to the wireless device in response to the received emergency status indication.

68. The system of claim 67, wherein the wireless transceiver and the processor of the first land vehicle are further configured to relay the received emergency status indication, wherein the emergency status indication includes data about the wireless device.

69. The system of claim 36, wherein the direct communication of the information includes the wireless transceiver and the processor of the first land vehicle:
receiving, from the wireless device, an emergency status indication carrying the information;
decoding the information carried by the emergency status indication; and
transmitting the decoded information to a base station.

70. The system of claim 69, wherein the transmitted decoded information is used by the base station to determine an identity and a location of the wireless device.

71. The system of claim 36, wherein the wireless transceiver and the processor of the first land vehicle are configured to form a mesh network with other land vehicles and exchange information with the other land vehicles.

72. The system of claim 36, wherein the wireless transceiver and the processor of the first land vehicle are configured to receive information from a base station and utilize the received information from the base station to search for wireless devices.

73. The system of claim 36, wherein the wireless transceiver and the processor of the land vehicle are configured to:
transmit, to the wireless device, an instruction and scheduling information for an acknowledgement signal; and
receive, from the wireless device, the acknowledgement signal based on the scheduling information.

74. The system of claim 36, wherein the direct communication of the information includes the wireless transceiver and the processor of the first land vehicle receiving, from the wireless device, a distress signal indicating an emergency event.

75. The system of claim 74, wherein the wireless transceiver and the processor of the first land vehicle receive the distress signal indicating the emergency event in a frequency band designated for an emergency state.

76. The system of claim 36, wherein the wireless device comprises:
a second processor; and
a surrounding environment sensor configured to output surrounding environment data to the second processor, wherein the directly communicated information is based on the output surrounding environment data; and
the system further comprising:
a second wireless device comprising:
a third processor; and
a second surrounding environment sensor configured to output second surrounding environment data to the third processor.

77. The system of claim 76, wherein the wireless transceiver and the processor are further configured to:
receive directly communicated second information based on the output second surrounding environment data; and
observe the surrounding environment using the directly communicated information and the directly communicated second information.

78. The system of claim 36, wherein the direct communication of the information includes the wireless transceiver and the processor of the first land vehicle transmitting control information to the wireless device and the wireless device performing a function in response to receiving the control information.

79. The system of claim 78, wherein the control information indicates terminating a process at the wireless device.

80. The system of claim 36, wherein the wireless transceiver and the processor of the first land vehicle are further configured to:
receive, from a base station, control information; and
perform a function in response to the control information.

81. The system of claim 36, wherein the wireless transceiver and the processor of the first land vehicle are further configured to:
  transmit a second primary synchronization signal and transmit a second secondary synchronization signal in operating frequency bands for normal operation, wherein the primary synchronization signal and the second secondary synchronization signal are transmitted in an operating frequency band different from the operating frequency bands for normal operation.

\* \* \* \* \*